(12) United States Patent
Vierkotten et al.

(10) Patent No.: US 10,851,739 B2
(45) Date of Patent: Dec. 1, 2020

(54) CONTROL DEVICE FOR AN INTERNAL COMBUSTION ENGINE

(71) Applicants: PIERBURG GMBH, Neuss (DE); FORD-WERKE GMBH, Cologne (DE)

(72) Inventors: Dirk Vierkotten, Much (DE); Maximilian Flender, Duesseldorf (DE); Andreas Kuske, CM Geulle (NL); Franz Arnd Sommerhoff, Aachen (DE); Joerg Kemmerling, Monschau (DE); Vanco Smiljanovski, Bedburg (DE); Helmut Kindl, Aachen (DE); Hanno Friederichs, Aachen (DE); Christian Vigild, Aldenhoven (DE)

(73) Assignees: PIERBURG GMBH, Neuss (DE); FORD-WERKE GMBH, Cologne (DE)

( * ) Notice: Subject to any disclaimer, the term of this patent is extended or adjusted under 35 U.S.C. 154(b) by 0 days.

(21) Appl. No.: 16/607,365

(22) PCT Filed: Apr. 17, 2018

(86) PCT No.: PCT/EP2018/059730
§ 371 (c)(1),
(2) Date: Oct. 23, 2019

(87) PCT Pub. No.: WO2018/197258
PCT Pub. Date: Nov. 1, 2018

(65) Prior Publication Data
US 2020/0141365 A1    May 7, 2020

(30) Foreign Application Priority Data

Apr. 27, 2017 (DE) .................. 10 2017 109 066

(51) Int. Cl.
*F02M 26/19* (2016.01)
*F02M 26/02* (2016.01)
(Continued)

(52) U.S. Cl.
CPC ............. *F02M 26/19* (2016.02); *B01F 3/028* (2013.01); *B01F 5/008* (2013.01); *F02D 9/02* (2013.01);
(Continued)

(58) Field of Classification Search
CPC ........ F02M 26/19; F02M 26/02; F02M 26/21; F02M 26/64; F02M 26/70;
(Continued)

(56) References Cited

U.S. PATENT DOCUMENTS

| 4,171,689 A | 10/1979 | Eheim |
| 2015/0027420 A1 | 1/2015 | Antoni et al. |

(Continued)

FOREIGN PATENT DOCUMENTS

| DE | 27 03 687 A1 | 8/1978 |
| DE | 20 2014 100 190 U1 | 3/2014 |

(Continued)

*Primary Examiner* — Xiao En Mo
(74) *Attorney, Agent, or Firm* — Norman B. Thot

(57) ABSTRACT

A control device for an internal combustion engine includes an intake channel, an exhaust gas recirculation channel which enters into the intake channel, a control element, a mixing housing which forms the intake channel, a connection element, a compressor, and a shaft. The mixing housing has a mouth of the exhaust gas recirculation channel in a lower area, an outlet, a mixing housing section, and a bowl-shaped recess. The cross-sectional extension is formed via the mixing housing to provide an axial stop face. The connection element abuts against the axial stop face and is radially limited by an axially opposite inner wall surface on the stop face. The mixing housing section has a recess (Continued)

arranged at the lowest point of the mixing housing section and below the axially opposite inner wall surface. The recess enters into the bowl-shaped recess of the mixing housing.

13 Claims, 4 Drawing Sheets

(51) Int. Cl.
| | | |
|---|---|---|
| *F02M 26/21* | (2016.01) | |
| *F02M 26/64* | (2016.01) | |
| *F02M 26/70* | (2016.01) | |
| *B01F 3/02* | (2006.01) | |
| *B01F 5/00* | (2006.01) | |
| *F02D 9/02* | (2006.01) | |
| *F02D 9/10* | (2006.01) | |
| *F02M 35/10* | (2006.01) | |
| *F16K 11/044* | (2006.01) | |

(52) U.S. Cl.
CPC ............... *F02D 9/10* (2013.01); *F02M 26/02* (2016.02); *F02M 26/21* (2016.02); *F02M 26/64* (2016.02); *F02M 26/70* (2016.02); *F02M 35/10222* (2013.01); *F02M 35/10262* (2013.01); *F16K 11/044* (2013.01); *F02D 2009/0276* (2013.01)

(58) Field of Classification Search
CPC ....... F02M 35/10222; F02M 35/10262; F02M 26/35; F02M 26/10; F02M 26/06; F02M 26/07; F02M 35/10354; B01F 3/028; B01F 5/008; F02D 9/02; F02D 9/10; F02D 2009/0276; F16K 11/044
See application file for complete search history.

(56) References Cited

U.S. PATENT DOCUMENTS

| | | | |
|---|---|---|---|
| 2018/0328318 A1* | 11/2018 | Kuske | .................... F02M 26/70 |
| 2019/0003402 A1* | 1/2019 | Vierkotten | ............. F02M 26/50 |
| 2019/0107082 A1* | 4/2019 | Jenks et al. | ............. F02M 26/05 |
| 2020/0131998 A1* | 4/2020 | Vierkotten | ............. F02M 26/64 |

FOREIGN PATENT DOCUMENTS

| | | |
|---|---|---|
| DE | 10 2012 101 851 B4 | 6/2014 |
| DE | 20 2014 103 770 U1 | 10/2014 |
| DE | 10 2014 114 968 A1 | 4/2016 |
| DE | 10 2015 121 617 A1 | 6/2017 |

\* cited by examiner

CONTROL DEVICE FOR AN INTERNAL COMBUSTION ENGINE

CROSS REFERENCE TO PRIOR APPLICATIONS

This application is a U.S. National Phase application under 35 U.S.C. § 371 of International Application No. PCT/EP2018/059730, filed on Apr. 17, 2018 and which claims benefit to German Patent Application No. 10 2017 109 066.5, filed on Apr. 27, 2017. The International Application was published in German on Nov. 1, 2018 as WO 2018/197258 A1 under PCT Article 21(2).

FIELD

The present invention relates to a control device for an internal combustion engine, comprising an intake channel, an exhaust gas recirculation channel entering into the intake channel, a control element, a mixing housing in which the intake channel is formed, and which comprises a mouth of the exhaust gas recirculation channel in the lower area in relation to the ground surface, a shaft serving as a rotation axis on which the control element is eccentrically fixed and which is mounted in the intake channel upstream the mouth of the exhaust gas recirculation channel in the mixing housing, wherein the control element is movable, by rotating the shaft, between a first end position, in which the control element at least throttles the intake channel, and a second end position, in which the control element closes the exhaust gas recirculation channel.

BACKGROUND

Control devices are used in internal combustion engines to control the amount of exhaust gas and the amount of air which is discharged or supplied for combustion. Combinations of these control valves in which either one valve body controlling both an exhaust gas recirculation channel and an intake channel or two coupled valve bodies are operated by a common actuator are also known. These valve bodies accordingly serve as a combination of an exhaust gas recirculation valve with a throttle flap. In these embodiments, the exhaust gas recirculation channel enters directly downstream of the flap, which serves as a throttle valve, into the air intake channel. If an increase in the exhaust gas recirculation rate is desired, the exhaust gas recirculation valve is opened while the throttle flap is closed by the same amount, which results in an increase in the pressure drop in the exhaust gas recirculation channel, thereby increasing the proportion of the exhaust gas compared to the amount of intake air. Such an arrangement is described, for example, in DE 27 03 687 A1.

DE 10 2014 114 968 A1 describes a control device in which two flaps arranged in parallel are operated by a common eccentrically arranged rotary shaft so that, upon rotation of the two flaps, the first flap moves away from the valve seat of the air intake channel while the second flap moves closer to the valve seat of the exhaust gas recirculation channel until the air intake channel is completely opened and the exhaust gas recirculation channel is completely closed. For both the second flap controlling the exhaust gas recirculation channel and the first flap controlling the air intake channel, the valve seats are respectively formed as circumferential stoppers against which the flaps circumferentially abut in their position closing the respective channel. The rotary shaft is arranged at a housing wall between the mouth of the exhaust gas recirculation channel and the valve seat in the air intake channel, but outside the flow cross-section of the upstream channel section. It can also be recognized that a sealing is arranged to connect a subsequent compressor housing to the outer circumference of the flap housing. The sealing protrudes within the compressor housing when connecting the flap housing.

DE 10 2012 101 851 B4 describes a comparable control device in which a recess is formed at the outlet of the flap housing on the inner circumference into which the compressor housing can be slid against a stopper on the flap housing.

Even though these arrangements provide a sufficient controllability of the exhaust gas flow and the air flow, the problem is that the water dissolved in the exhaust gas and in the air, in particular after switching off the internal combustion engine, in particular in case of an automatic start-stop, flows either towards the compressor or enters into a gap between the two housings. When restarting the internal combustion engine, water which is in a liquid state is consequently conveyed towards the compressor impeller, which can in turn damage the impeller.

SUMMARY

An aspect of the present invention is to provide a control device for an internal combustion engine with which the durability of the compressor can be increased by reliably preventing the impeller from being loaded with liquid, in particular after starting the internal combustion engine.

In an embodiment, the present invention provides a control device for an internal combustion engine which includes an intake channel comprising an all around cross-sectional extension in a downstream area, an exhaust gas recirculation channel which enters into the intake channel, a control element, a mixing housing in which the intake channel is formed, a connection element, a downstream compressor, and a shaft. The mixing housing comprises a mouth of the exhaust gas recirculation channel in a lower area in relation to the ground surface, an outlet, a mixing housing section, and a bowl-shaped recess. The all around cross-sectional extension is formed via the mixing housing so as to provide an axial stop face. The connection element is configured to abut against the axial stop face. The connection element is radially limited by an axially opposite inner wall surface on the stop face. The downstream compressor comprises a connection nozzle which is configured to limit the inlet channel so that the inlet channel, limited by the connection nozzle, is in a fluid communication with the outlet of the mixing housing. The shaft serves as a rotation axis on which the control element is eccentrically fixed. The shaft is mounted in the intake channel upstream of the mouth of the exhaust gas recirculation channel in the mixing housing. The control element is movable, by rotating the shaft, between a first end position, in which the control element throttles the intake channel, and a second end position, in which the control element closes the exhaust gas recirculation channel. The mixing housing section comprises a recess which is arranged at least at the lowest point of the mixing housing section in relation to the ground surface and with respect to a cross-sectional shape of the connection element, and below the axially opposite inner wall surface, the recess being arranged to enter into the bowl-shaped recess of the mixing housing.

BRIEF DESCRIPTION OF THE DRAWINGS

The present invention is described in greater detail below on the basis of embodiments and of the drawings in which.

DETAILED DESCRIPTION

Figure 1:
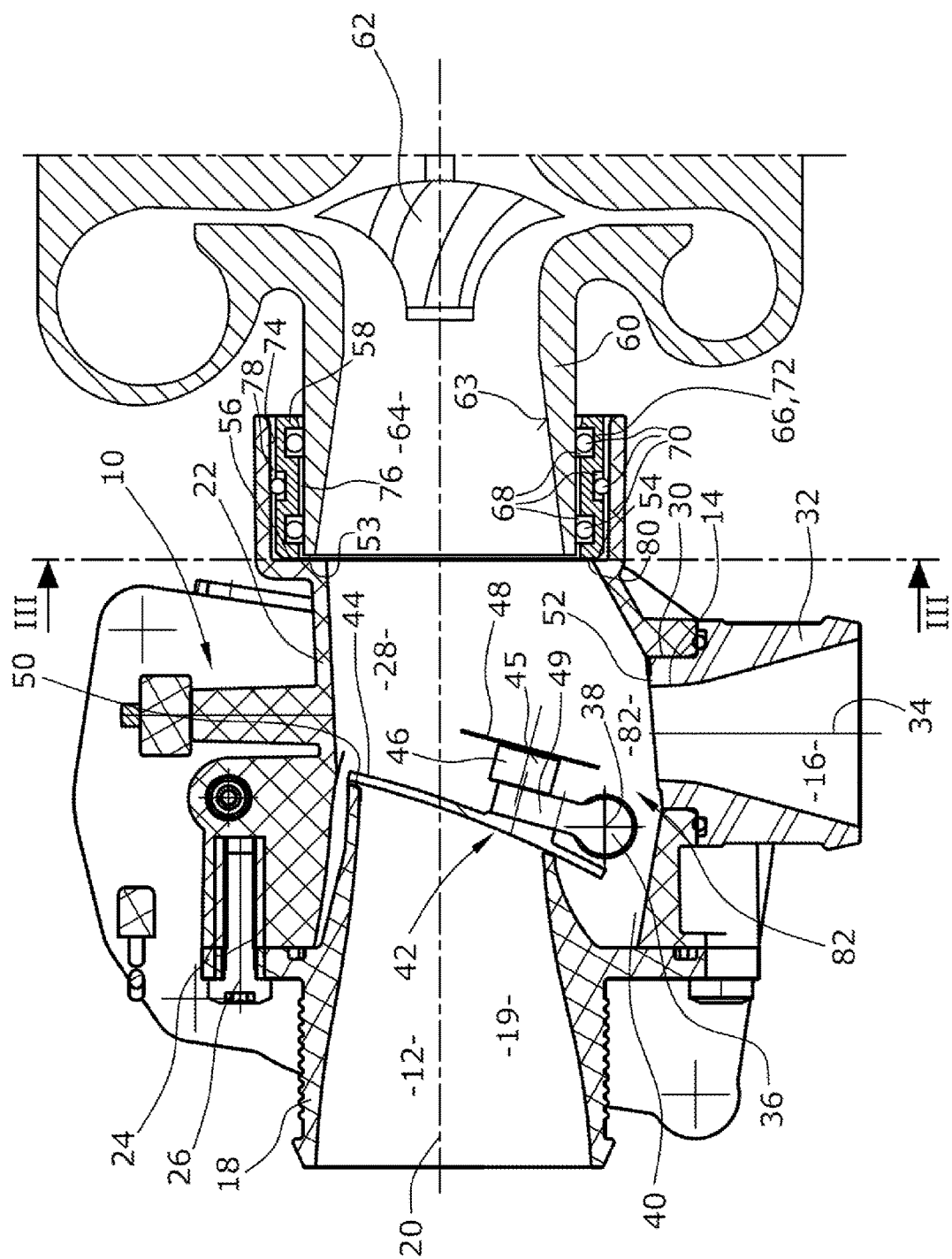
FIG. 1 shows a side view of a first embodiment of a control device according to the present invention in sectional view.

Due to the fact that the intake channel comprises, in a downstream area, an all-around cross-sectional extension, through which a stop face, against which a connection element abuts, through which an inlet channel, limited by a connection nozzle, of a downstream compressor is in fluid communication with the outlet of the mixing housing, is formed on a mixing housing section, wherein the mixing housing section comprises at the lowest point thereof in relation to the ground surface, in comparison to the cross-sectional shape of the connection element, a recess which is arranged below an axially opposite inner wall surface radially limiting the connection element on the stop face and which enters into a bowl-shaped recess of the mixing housing, it is achieved that, in case of a standstill of the internal combustion engine or in case of low flow velocity, liquid can flow off from the compressor housing towards the bowl-shaped recess of the mixing housing from the compressor connection nozzle. A sufficient stop face is nonetheless provided for reliably fixing the compressor connection nozzle to the mixing housing. The liquid can thus flow back to the exhaust gas recirculation channel to there be evaporated when the internal combustion engine is again switched on, so that damage to the compressor impeller due to liquid water is reliably prevented, or the liquid can drain through the exhaust gas recirculation channel and the exhaust cooler into the exhaust pipe. Connection elements in this context are either inlet nozzles of the compressor itself or an element via which the inlet nozzle is fixed to the mixing housing and in particular radially surrounds the inlet nozzle. The stop face according to the present invention is not only the face itself, but the mixing housing section on which the abutment face is formed.

In an embodiment of the present invention, the connection element can, for example, comprise a round, oval or elliptical cross-section adjacent to the stop face, and the recess of the mixing housing section, on which the stop face is formed, can, for example, be formed downwards due to an extension of the cross-section of the stop face in comparison to the adjacent cross-section of the connection element. In particular the mixing housing section of the mixing housing forming the stop face can thus comprise a horseshoe-like shape, wherein the horseshoe is opened downwards. An abutment face for positional orientation of the compressor housing towards the mixing housing thus results for the connection element across the entire closed area of the horseshoe, while the possibility of draining the water from the compressor housing to the exhaust gas recirculation channel is nevertheless provided in the lower area.

It is alternatively advantageous if the recess is formed by one or a plurality of bores in the lower area of the mixing housing section on which the stop face is formed. The liquid can also drain through these bores from the compressor housing in order to protect the compressor impeller. Such a configuration of the drain can also be formed subsequently in the mixing housing section.

Alternatively thereto, a plurality of adjacent axial grooves are formed in the lower area of the mixing housing section on which the stop face is formed. The plurality of adjacent axial grooves can be provided by milling or sawing in order to allow for condensate drain. Axial grooves in this context are grooves extending from the stop face in axial direction through the mixing housing section.

In an embodiment of the present invention, the connection nozzle of the downstream compressor, limiting the inlet channel, can, for example, form the connection element. The connection nozzle of the compressor is accordingly directly fixed, for example, by interposing one or a plurality of radial sealing rings, in the mixing housing section so that additional components can be omitted, whereby mounting is simplified.

In an embodiment of the present invention, the connection nozzle of the downstream compressor can, for example, protrude into an intermediate element forming the connection element and being arranged radially between the downstream area of the intake channel and the connection nozzle. Inaccuracies in production or slight displacements of the angular position of the housing of the compressor toward the mixing housing can be compensated with this intermediate element.

It is advantageous if the intermediate element comprises on its respective radial inner surface and on its radial outer surface at least one groove in which one respective radial sealing element is arranged, via which a gap between the downstream area of the mixing housing and the connection nozzle is sealed. A leakage of the condensate is thereby also reliably prevented as is an entry of an additional, non-measured gas stream from outside.

In an embodiment of the present invention, the inlet channel of the compressor can, for example, be designed to conically narrow towards the flow direction. The condensate in the inlet channel accordingly flows, after switching off the internal combustion engine, along the wall surface of the connection nozzle towards the mixing housing and thus towards the exhaust gas recirculation channel.

In an embodiment of the present invention, a radial inner wall surface of the intermediate element can, for example, be formed to conically extend towards the stop face in its area opposite to the stop face and to protrud from the connection nozzle of the compressor. In this embodiment, condensate flowing from the connection nozzle drops onto this extension and is discharged towards the mixing housing and kept away from the sealing so that no collection points for the water are created in the area of the connection of the housing.

In an embodiment of the present invention, the shaft can, for example, be arranged outside the flow cross-section of a first upstream channel section of the intake channel. Pressure losses are thereby reliably prevented.

It is also particularly advantageous if the exhaust gas recirculation channel enters into the intake channel at a lowest point of the bowl-shaped area of the mixing housing. In such an embodiment, the condensate not only gets into the mixing housing, but can also flow into the exhaust gas recirculation channel if the internal combustion engine stops so that the condensate can evaporate during the next start or can flow through the cooler to the exhaust pipe.

The first upstream channel section is advantageously limited by a valve seat against which the control element abuts in a position completely closing the intake channel. A tight seal of the intake channel can thereby be produced.

A particularly simple production of this valve seat occurs when the valve seat is formed by an axial end of a first housing part of the mixing housing forming the upstream channel section and protruding into a second housing part of the mixing housing.

A control device is thus created via which damage to a compressor, arranged behind a mixing housing, due to occurring condensate conveyed to the compressor and collecting, in particular after switching off the engine, in the area of the connection nozzle of the compressor and in the mixing housing of the control device, is prevented because the condensate can flow from the connection nozzle of the compressor to the mixing housing and thus to the exhaust gas recirculation channel so that the liquid water can be evaporated by the heat of the exhaust gas flow before getting to the compressor impeller when starting the engine. The durability of the compressor is thereby increased.

An exemplary embodiment of a control device according to the present invention is illustrated in the drawings and is described below.

The control device according to the present invention comprises a mixing housing 10 which limits an intake channel 12, and in which a mouth 14 of an exhaust gas recirculation channel 16 is formed. Intake channel 12 is substantially in a straight direction, while exhaust gas recirculation channel 16 enters into intake channel 12 in the lower area of mixing housing 10 relative to the ground surface perpendicular to intake channel 12.

Mixing housing 10 comprises a first, substantially tube-shaped first housing part 18 which forms a first channel section 19 and whose downstream end is inclined and encloses an angle α of about 75° to a central axis 20 of first housing part 18. The downstream end of the first housing part 18 is arranged inside the second housing part 22 and/or it is slid into the second housing part 22 until a flange 24 abuts via which the first housing part 18 is fixed to the second housing part 22 by screws 26. The second housing part 22 forms a second channel section 28 of intake channel 12 in which an opening 30 is formed which is arranged in flow direction at a short distance behind the inclined end of the first housing part 18 and which serves as a reception for a third housing part 32 which forms the mouth 14 of exhaust gas recirculation channel 16 whose central axis 34 is arranged perpendicular to central axis 20 of intake channel 12.

In mixing housing 10, a rotary shaft 36 is rotatably arranged which can be operated by an actuator (which is not shown in the drawings). Rotation axis 38 of rotary shaft 36 is arranged perpendicular to central axis 20, 34 and is disposed between mouth 14 of exhaust gas recirculation channel 16 downstream to rotary shaft 36 and the axial end of the first housing part 18 and directly downstream the first housing part 18. The overall cross-section of the first housing part 18 is smaller than that of the second housing part 22 of intake channel 12, wherein the first housing part 18 is fixed to the second housing part 22 so that a recess 40, formed in the area of mouth 14 of exhaust gas recirculation channel 16, is arranged outside the flow cross-section in which rotary shaft 36 of the second housing part 22 is arranged in a penetrating manner.

A control element 42 is fixed to rotary shaft 36, which is eccentrically arranged in intake channel 12, which is rotatably arranged within the second channel section 28 and includes a first flap part 44 and a second flap part 45 comprising a support axis 46 and a flap body 48 fixed thereto in a tiltable manner, wherein support axis 46 is fixed in a bore 49 of the first flap part 44. The first flap part 44 comprises a receiving opening in which rotary shaft 36 is fixed and is rotatable by a rotary shaft 36 in a first end position against the end of the first housing part 18 which correspondingly serves as a first valve seat 50, while flap body 48 is rotatable against an end of mouth 14 of exhaust gas recirculation channel 16 which serves as a second valve seat 52. Upon rotation of rotary shaft 36, exhaust gas recirculation channel 16 is accordingly closed by flap body 48 and is reversed to the same extent as the first flap part 44 releases intake channel 12. Upon this rotary movement of rotary shaft 36 to a second end position in which flap body 48 abuts on the second valve seat 52, the tiltable fixation of flap body 48 results in a complete tight sealing of exhaust gas recirculation channel 16, since flap body 48 can adjust its position, due to the possible tilting movement, to the position of the second valve seat 52, even if the second valve seat 52 is not completely aligned with rotation axis 38.

In its other, non-illustrated end position, flap body 48 abuts on second valve seat 52 of exhaust gas recirculation channel 16, while the first flap part 44 completely releases intake channel 12. All intermediate positions can of course also be provided for control.

In the downstream area of intake channel 12, a mixing housing section 53 is formed at the second housing part 22 on which a cross-sectional extension 54 is formed through which an axial stop face 56 is created. With this cross-section, mixing housing 10 continues up to its outlet 58. A connection nozzle 60 of a compressor 62, forming an inlet channel 64 of compressor 62, whose radial inner wall surface 63 is designed conically narrowing in flow direction, protrudes into this outlet 58.

Figure 2:
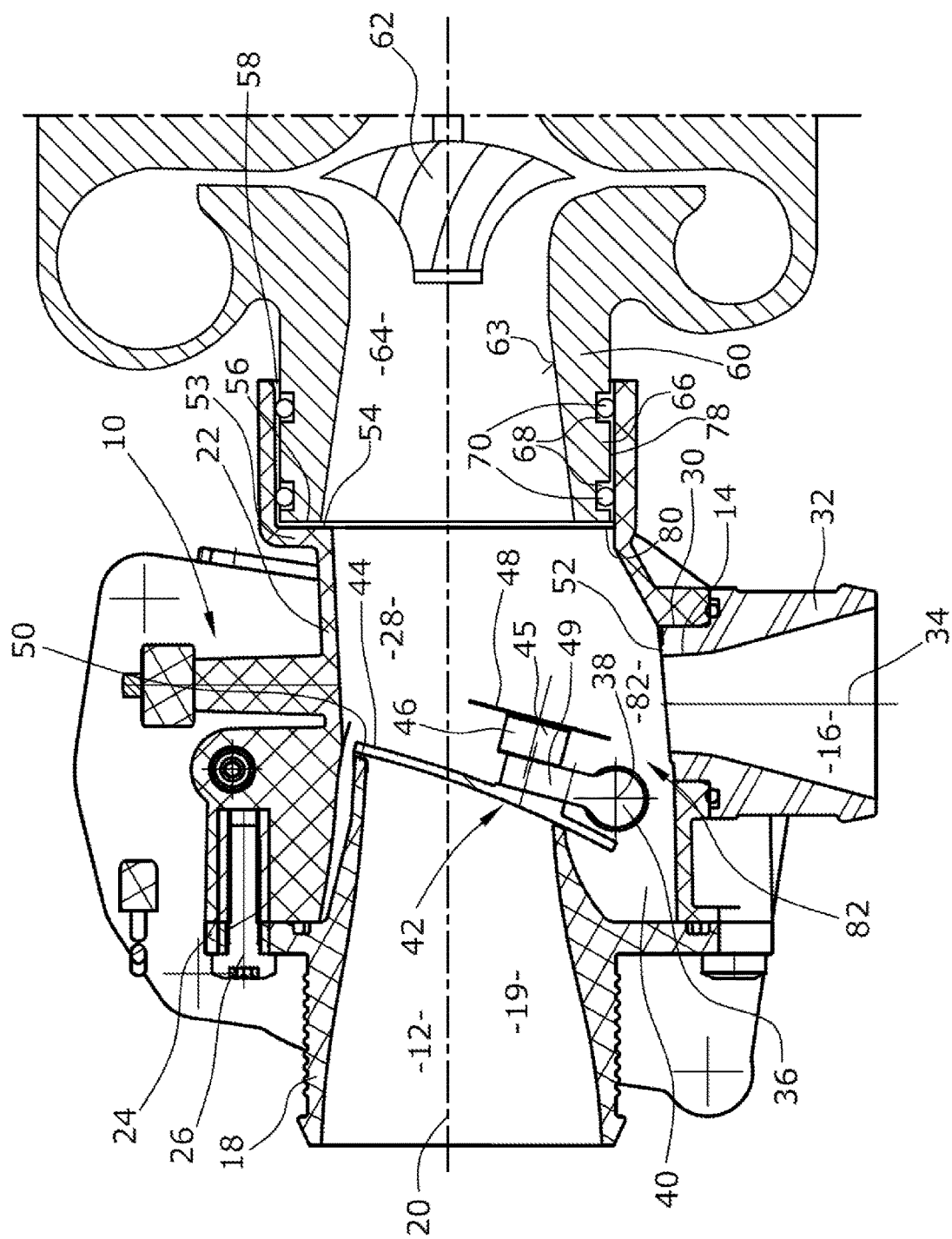
FIG. 2 shows a side view of a second embodiment of a control device according to the present invention in sectional view.

In the exemplary embodiment shown in FIG. 2, connection nozzle 60 itself serves as a connection element 66 and, by interposing a sealing element 70 in the form of a radial sealing ring arranged in a groove 68, protrudes into outlet 58 of mixing housing 10, while in the exemplary embodiment according to FIG. 1, an annular intermediate element 72 on whose radial outer surface 74 a groove 68 is formed, in which a sealing element 70 designed as a radial sealing ring is arranged, and on whose radial inner surface 76 two further grooves 68 are formed, in which a respective further sealing element 70 is arranged, serves as a connection element 66.

A gap 78 between the downstream area of mixing housing 10 and the respective connection element 66 is sealed by sealing element 70 on the outer circumference of compressor 62 as well as by the sealing elements 70 on the intermediate element 72.

In the embodiment according to FIG. 1, intermediate element 72 is slid against axial stop face 56 of mixing housing section 53, while connection nozzle 60 of compressor 62 is slid into the intermediate element 72.

Figure 3:
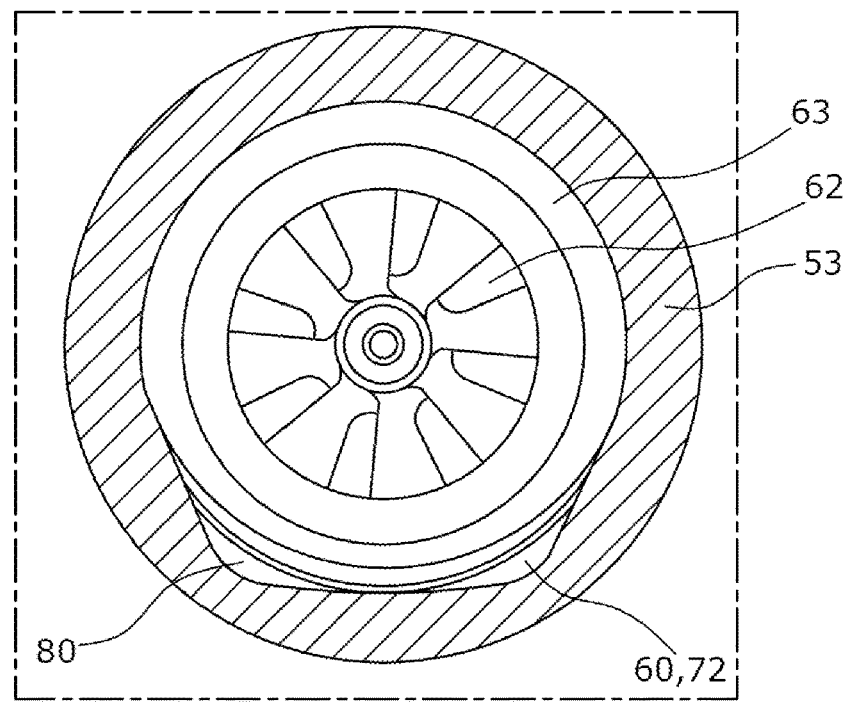
FIG. 3 shows a top view with a section along line III-III in FIG. 1.

According to the present invention, mixing housing section 53, on which axial stop face 56 is formed, now comprises a recess 80 in the lower area in relation to the ground surface so that in this lower area axial stop face 56 is only formed opposite intermediate element 72, however, no abutment face exists opposite connection nozzle 60. It is also possible to completely omit axial stop face 56 in this lower area. In the embodiments according to FIGS. 1 to 3, the cross-section in this mixing housing section 53 corresponds approximately to a horseshoe shape that is designed to be opened downwards. This shape can be clearly recognized in FIG. 3. Recess 80 thus forms a downward extension of the free cross-section of mixing housing section 53 so that axial stop face 56 is arranged in this lower area below an opposite, radially limited inner wall surface of connection element 66, which is formed in the exemplary embodiment according to FIG. 1 by the radial inner surface of intermediate element 72 and in the exemplary embodiment according to FIG. 2 by the inner wall surface 63 of connection nozzle 60 of compressor 62.

When switching off the internal combustion engine, compressor 62 cools down together with mixing housing 10 and connection nozzle 60. Water vapor, which, at this point in time, has been dissolved in the previously aspirated gas flow, is condensed and passes along the inner wall surface 63 of inlet channel 64 downwards in accordance with gravitational force. Due to the conical shape of inlet channel 64, the water flows towards mixing housing 10. Due to recess 80 in the lower area of mixing housing section 53, the water, however, does not collect between the respective connection element 66 and axial stop face 56 of mixing housing 10, but gets into mixing housing 10, which comprises a bowl-shaped recess 82 in this area at whose lower end exhaust gas recirculation channel 16 enters so that the water is directed to exhaust gas recirculation channel 16 where it is again evaporated, upon restarting the engine, by the heat of the exhaust gas and thus cannot get to compressor 16 as water, thereby preventing damage to the compressor. The condensate alternatively gets through the cooler into the exhaust pipe and thus behind the exhaust gas take-off point so that it also cannot get to the compressor.

In the embodiment according to FIG. 1, in order to provide that the water does not flow into a gap between intermediate element 72 and connection nozzle 60 of compressor 62, intermediate element 72 comprises a conically shaped inner wall surface 76 in an area arranged opposite stop face 56 or at least opposite to recess 80 of mixing housing section 53 of mixing housing 10 and axially protrudes from the end of connection nozzle 60 of compressor 62 so that water dropping from connection nozzle 60 onto intermediate element 72 is also discharged into the bowl-shaped recess 82 of mixing housing 10.

Figure 4:
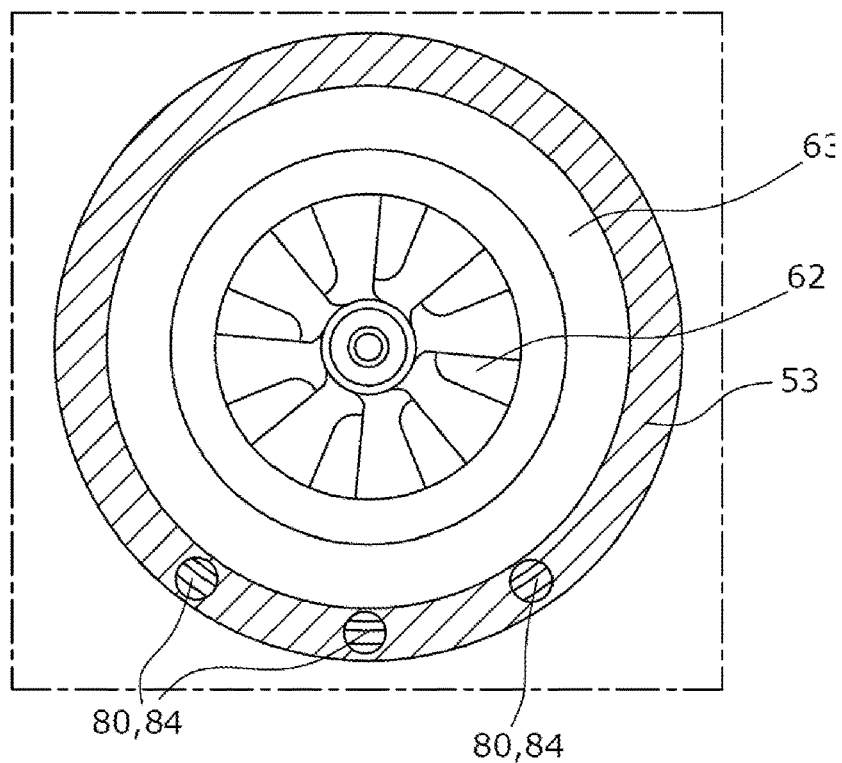
FIG. 4 shows an embodiment of the configuration in FIG. 3.
Figure 5:
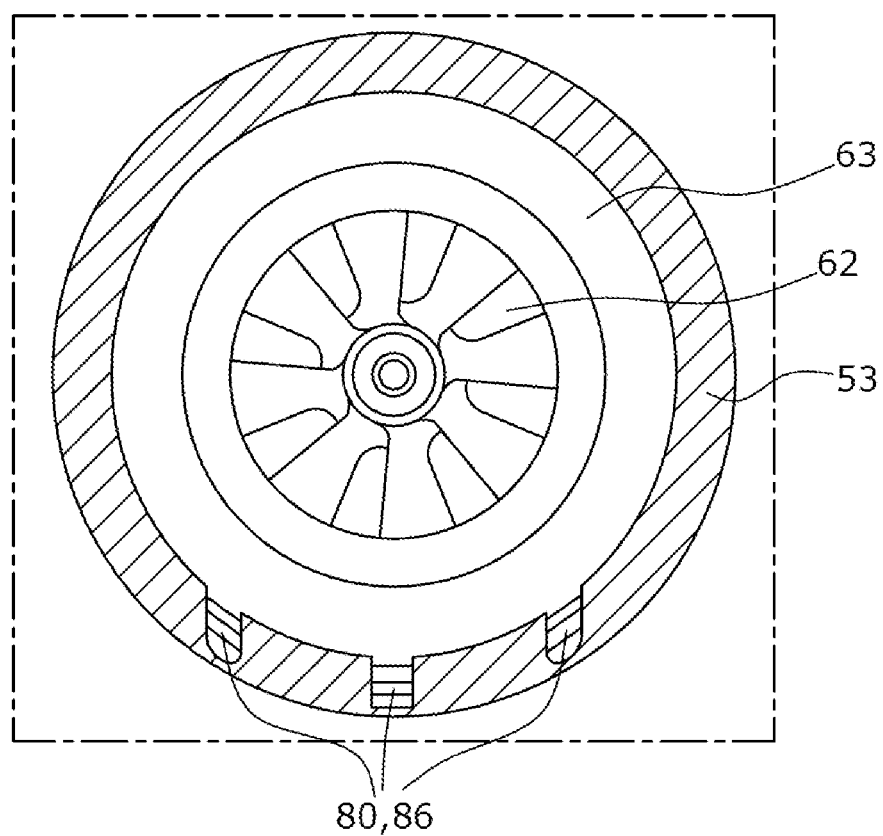
FIG. 5 shows an embodiment of the configuration in FIG. 3.

In the embodiment according to FIGS. 4 and 5, recess 80, through which the water can be discharged from connection nozzle 60 to mixing housing 10, is formed by adjacent bores 84 (FIG. 4) or axial grooves 86 (FIG. 5) which are formed in a lower area of mixing housing section 53 in relation to the ground surface.

The described control device is thus suitable for being used in front of a compressor of an internal combustion engine that is either designed electrically or as a compressor of an exhaust gas turbocharger. It is prevented in both cases that the rapidly rotating compressor impeller is flowed in by liquid water, which would cause damage to the compressor, by discharging the water condensed upon stopping the internal combustion engine to the exhaust gas recirculation channel. The embodiments according to the present invention are also suitable for continuously leading the condensate away, which is permanently produced during engine operation, from the compressor in order prevent that, in the case of a burst of acceleration, the condensate can be carried away to the compressor, which could result in erosive damage to the compressor impeller. A fixed and tight connection of the compressor to the mixing housing of the control device can nonetheless be provided.

The present invention is not limited to embodiments described herein; reference should be had to the appended claims.

What is claimed is:

1. A control device for an internal combustion engine, the control device comprising:

an intake channel comprising an all around cross-sectional extension in a downstream area;
an exhaust gas recirculation channel which enters into the intake channel;
a control element;
a mixing housing in which the intake channel is formed, the mixing housing comprising a mouth of the exhaust gas recirculation channel in a lower area in relation to the ground surface, an outlet, a mixing housing section, and a bowl-shaped recess, the all around cross-sectional extension being formed via the mixing housing so as to provide an axial stop face;
a connection element which is configured to abut against the axial stop face, the connection element being radially limited by an axially opposite inner wall surface on the stop face;
a downstream compressor comprising a connection nozzle which is configured to limit the inlet channel so that the inlet channel, limited by the connection nozzle, is in a fluid communication with the outlet of the mixing housing;
a shaft which serves as a rotation axis on which the control element is eccentrically fixed, the shaft being mounted in the intake channel upstream of the mouth of the exhaust gas recirculation channel in the mixing housing, wherein, the control element is movable, by rotating the shaft, between a first end position, in which the control element throttles the intake channel, and a second end position, in which the control element closes the exhaust gas recirculation channel, and
the mixing housing section comprises a recess which is arranged at least at the lowest point of the mixing housing section in relation to the ground surface and with respect to a cross-sectional shape of the connection element, and below the axially opposite inner wall surface, the recess being arranged to enter into the bowl-shaped recess of the mixing housing.

2. The control device as recited in claim 1, wherein,
the cross-sectional shape of the connection element is a round cross section, an oval cross section, or an elliptical cross section which is adjacent to the stop face, and
the recess of the mixing housing section, on which the stop face is formed, is formed downwards due to an extension of a cross-section of the mixing housing section compared to the round cross section, the oval cross section, or the elliptical cross of the connection element arranged adjacent thereto.

3. The control device as recited in claim 1, wherein the recess is formed by at least one bore in a lower area of the mixing housing section on which the stop face is formed.

4. The control device as recited in claim 1, wherein the mixing housing section further comprises a plurality of adjacent axial grooves which are formed in a lower area of the mixing housing section on which the stop face is formed.

5. The control device as recited in claim 1, wherein the connection nozzle of the downstream compressor which limits the inlet channel forms the connection element.

6. The control device as recited in claim 1, wherein,
an intermediate element forms the connection element,
the connection nozzle of the downstream compressor is arranged to protrude into the intermediate element, and
the intermediate element is arranged radially between a downstream area of the intake channel and the connection nozzle.

7. The control device as recited in claim 6, further comprising:
sealing elements,
wherein,
the intermediate element comprises at least one groove on each of a radial inner surface and a radial outer surface,
a respective one of the sealing elements is arranged in each of the at least one groove so as to seal a gap between the downstream area of the mixing housing and the connection nozzle.

8. The control device as recited in claim 6, wherein the radial inner surface of the intermediate element is formed to extend conically towards the stop face in an area opposite to the stop face and to protrude from the connection nozzle of the downstream compressor.

9. The control device as recited in claim 1, wherein the inlet channel is arranged to be conically narrowing towards a flow direction.

10. The control device as recited in claim 1, wherein,
the intake channel comprises a first upstream channel section, and
the shaft is arranged outside of a flow cross-section of the first upstream channel section.

11. The control device as recited in claim 10, wherein the first upstream channel section is limited by a valve seat against which the control element abuts in a position which completely closes the intake channel.

12. The control device as recited in claim 11, wherein,
the mixing housing further comprises a first housing part which comprises an axial end and which forms the first upstream channel section, and a second housing part,
the valve seat is formed by the axial end of the first housing part of the mixing housing, and
the first housing part protrudes into the second housing part.

13. The control device as recited in claim 1, wherein the exhaust gas recirculation channel enters into the intake channel at a lowest point of the bowl-shaped recess of the mixing housing.

* * * * *